United States Patent [19]

Jaffe et al.

[11] Patent Number: 4,457,962
[45] Date of Patent: Jul. 3, 1984

[54] MOLDED ARTICLE COMPRISED OF A THERMOTROPIC LIQUID CRYSTAL LINE POLYMER WITH AN INHERENTLY WEAK WELD LINE INCORPORATED THEREIN

[75] Inventors: Michael Jaffe, Maplewood, N.J.; Zohar Ohir, Haifa, Israel

[73] Assignee: Celanese Corporation, New York, N.Y.

[21] Appl. No.: 413,759

[22] Filed: Sep. 1, 1982

[51] Int. Cl.³ .................. F16L 9/16; B65D 65/28; B29F 3/04
[52] U.S. Cl. ........................ 428/36; 428/43; 428/480; 428/325; 428/329; 428/331; 428/327; 428/326; 428/328; 528/190; 264/177 R
[58] Field of Search .................... 428/43, 36, 480

[56] References Cited

U.S. PATENT DOCUMENTS

| | | | |
|---|---|---|---|
| 3,527,859 | 9/1970 | Fairbanks | 428/43 X |
| 4,076,121 | 2/1978 | Clayton | 428/43 |
| 4,083,829 | 4/1978 | Calundann et al. | 528/176 |
| 4,093,761 | 6/1978 | Taylor | 428/43 |
| 4,161,470 | 7/1979 | Calundann | 528/190 X |

Primary Examiner—P. Ives
Attorney, Agent, or Firm—Burns, Doane, Swecker & Mathis

[57] ABSTRACT

An article is provided comprised of a thermotropic liquid crystalline polymer having an inherently weak weld line incorporated therein which renders the article suitable for use as a breakaway part.

16 Claims, 3 Drawing Figures

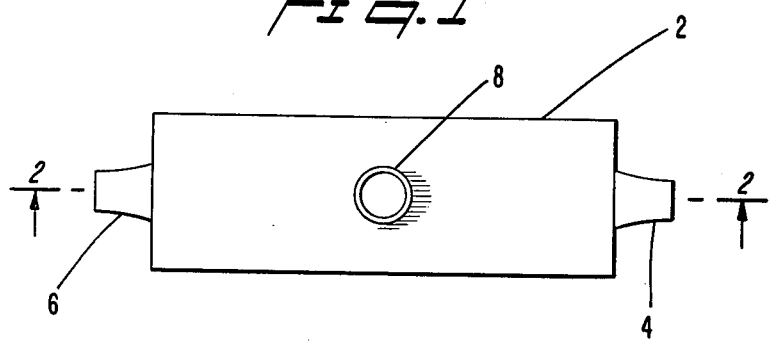
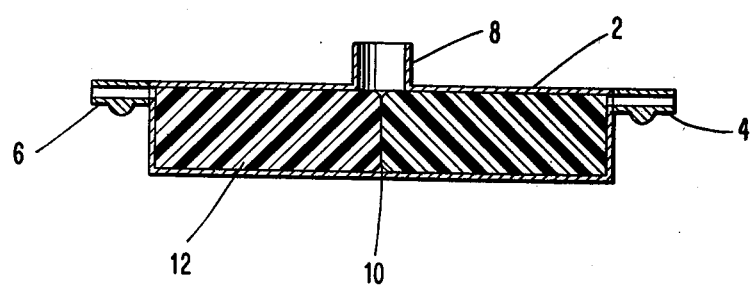
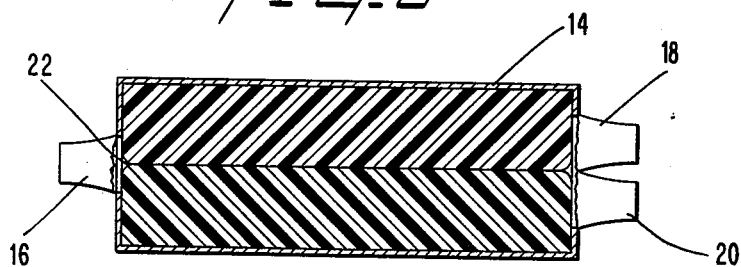

MOLDED ARTICLE COMPRISED OF A THERMOTROPIC LIQUID CRYSTAL LINE POLYMER WITH AN INHERENTLY WEAK WELD LINE INCORPORATED THEREIN

BACKGROUND OF THE INVENTION

The present invention is directed to an article comprised of a thermotropic liquid crystalline polymer having an inherently weak weld line.

Plastic articles have long been employed which have been rendered inherently weak at certain predetermined locations of the article to enable the article to be broken or separated into distinct pieces of predetermined size and/or dimension.

It is desirable, however, to provide plastic articles comprised of a polymer which exhibits desirable mechanical properties and which enables weld lines of desirable weakness to be easily provided therein.

SUMMARY OF THE INVENTION

In accordance with the present invention, a molded article is provided comprised of a polymer which is capable of forming an anisotropic melt phase and which article includes an inherently weak weld line incorporated therein which traverses said article and enables said article to be readily separated into separate and distinct portions of predetermined dimension by application of sufficient load whereby said article is caused to separate at said weld line.

BRIEF DESCRIPTION OF THE DRAWINGS

FIG. 1 depicts a top view of an injection mold suitable for use in preparation of the articles of the present invention;

FIG. 2 depicts the mold of FIG. 1 in vertical cross-section subsequent to the injection molding process;

FIG. 3 depicts another injection mold suitable for use in the present invention in horizontal cross-section subsequent to the injection molding process.

DETAILED DESCRIPTION OF THE INVENTION

It has been surprisingly and unexpectedly discovered that thermotropic liquid crystalline polymers are particularly suitable for use in the production of an article having an inherently weak weld line which enables the article to be readily separated into separate and distinct components at the weld line.

Thermotropic liquid crystal polymers are polymers which are liquid crystalline (i.e., anisotropic) in the melt phase. These polymers have been described by various terms, including "liquid crystalline," "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Thermotropic liquid crystal polymers include but are not limited to wholly and non-wholly aromatic polyesters, aromatic-aliphatic polyesters, aromatic polyazomethines, aromatic polyester-carbonates and aromatic and non-wholly aromatic polyester-amides.

The aromatic polyesters and polyester-amides are considered to be "wholly" aromatic in the sense that each moiety present in the polyester contributes at least one aromatic ring to the polymer backbone and which enable the polymer to exhibit anisotropic properties in the melt phase. Such moieties may be derived from aromatic diols, aromatic amines, aromatic diacids and aromatic hydroxy acids. Moieties which may be present in the thermotropic liquid crystal polymers employed in the present invention (wholly or non-wholly aromatic) include but are not limited to the following:

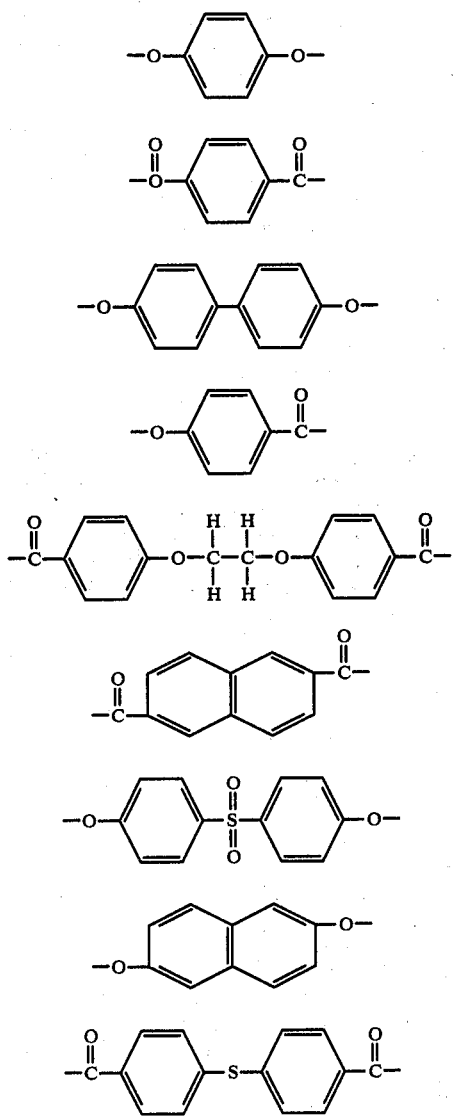

-continued

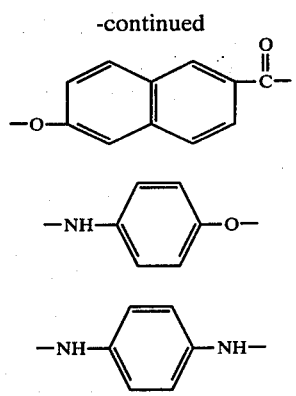

Preferably, the thermotropic liquid crystal polymers which are employed comprise not less than about 10 mole percent of recurring units which include a naphthalene moiety. Preferred naphthalene moieties include 6-oxy-2-naphthoyl, 2,6-dioxynaphthalene and 2,6-dicarboxynaphthalene.

Specific examples of aromatic-aliphatic polyesters are copolymers of polyethylene terephthalate and hydroxybenzoic acid as disclosed in *Polyester X7G-A Self Reinforced Thermoplastic*, by W. J. Jackson, Jr. H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I. Preparation and Properties of p-Hydroxybenzoic Acid Copolymers," *Journal of Polymer Science, Polymer Chemistry Edition*, Vol. 14, pp. 2043-58 (1976), by W. J. Jackson. Jr., and H. F. Kuhfuss. The above-cited references are herein incorporated by reference in their entirety.

Aromatic polyazomethines and processes of preparing the same are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrolo-2-methyl-1,4-phenylenenitrolomethylidyne-1,4-phenylene-methylidyne); and poly(nitrolo-2-chloro-1,4-phenylenenitrilomethyldyne-1,4-phenylene-methylidyne).

Aromatic polyester-carbonates are disclosed in U.S. Pat. Nos. 4,107,143 and 4,284,757 and U.S. patent application Ser. No. 319,024, filed Nov. 6, 1981, now U.S. Pat. No. 4,371,660 which are herein incorporated by reference in their entirety. Examples of such polymers include those consisting essentially of p-oxybenzoyl units, p-dioxyphenyl units, dioxycarbonyl units, and terephthoyl units.

Aromatic polyester-amides and processes of preparing the same are disclosed in U.S. Pat. No. 4,182,842. Further disclosure of such copolymers can be found in "Liquid Crystal Polymers: III Preparation of Properties of Poly(Ester Amides) from p-Aminobenzoic Acid and Poly(Ethylene Terephthalate)," *Journal of Applied Polymer Science*, Vol. 25, pp. 1685-1694 (1980), by W. J. Jackson, Jr., and H. F. Kuhfuss. The above-cited references are herein incorporated by reference in their entirety.

The liquid crystal polymers which are preferred for use in the present invention are the thermotropic wholly aromatic polyesters. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; 4,188,476; 4,226,970; 4,201,856; 4,232,143; 4,232,144; 4,245,082; and 4,238,600; and (f) U.K. application No. 2,002,404.

Wholly aromatic polymers which are preferred for use in the present invention include wholly aromatic polyesters and polyester-amides which are disclosed in commonly-assigned U.S. Pat. Nos. 4,067,852; 4,083,829; 4,130,545; 4,161,470; 4,184,996; 4,219,461; 4,238,598; 4,238,599; 4,230,817; 4,256,624; 4,244,433; 4,279,803; 4,299,756; 4,330,457; 4,339,375; 4,337,191; and 4,341,688; and in commonly-assigned U.S. application Serial Nos. 251,625 and 251,629, each filed Apr. 6, 1981 now U.S. Pat. Nos. 4,351,917 and 4,351,918 respectively; and 251,819, filed Apr. 7, 1981 now U.S. Pat. No. 4,335,132. The disclosure of all of the above identified commonly-assigned U.S. Patents and applications are herein incorporated by reference in their entirety. The wholly aromatic polyesters and polyester-amides disclosed therein typically are capable of forming an anisotropic melt phase at a temperature below approximately 400° C., and preferably below approximately 350° C.

The thermotropic liquid crystal polymers including wholly aromatic polyesters and polyester-amides which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety. Although that patent is directed to the preparation of wholly aromatic polyesters, the process may also be employed to form polyester-amides When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided. When polyester-amides are to be formed, an amine group may be provided as lower acyl amide.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters and polyester-amides suitable for use in the present invention tend to be substantially insoluble in common polyester solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic polyester-amides which are preferred for use in the present invention commonly exhibit a molecular weight of about 5,000 to 50,000, and preferably about 10,000 to 30,000; e.g., 15,000 to 17,000. Such molecular weight may be determined by gel permeation chromatography and other standard techniques not involving the solutioning of the polymer; e.g., by end group determination via infrared spectroscopy on compression molded films. Alternatively, light scattering techniques in pentafluorophenol solution may be employed to determine the molecular weight.

The wholly aromatic polyesters and polyester-amides additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine and bromine. Although bromine atoms tend to be released from organic compounds at high temperatures, bromine is more stable on aromatic rings than on aliphatic chains, and therefore is suitable for inclusion as a possible substituent on the aromatic rings.

Especially preferred wholly aromatic polyesters and polyester-amides are those which are disclosed in above-noted U.S. Pat. Nos. 4,161,470, 4,184,996 4,219,461, 4,256,624, 4,238,599 and 4,330,457, with the polyesters disclosed in U.S. Pat. No. 4,161,470 being most preferred.

The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

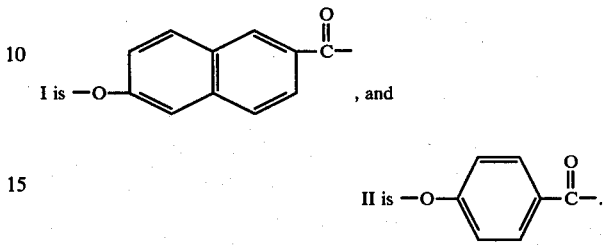

The polyester comprises approximately 10 to 90 mole percent of moiety I, and approximately 10 to 90 mole percent of moiety II. In one embodiment, moeity II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted pheny, and mixtures thereof.

The wholly aromatic polyester which is disclosed in U.S. Pat. No. 4,184,996 is a melt processable wholly aromatic polyester capable of forming an anisotropic melt phase at a temperature below approximately 325° C. The polyester consists essentially of the recurring moieties I, II and III wherein:

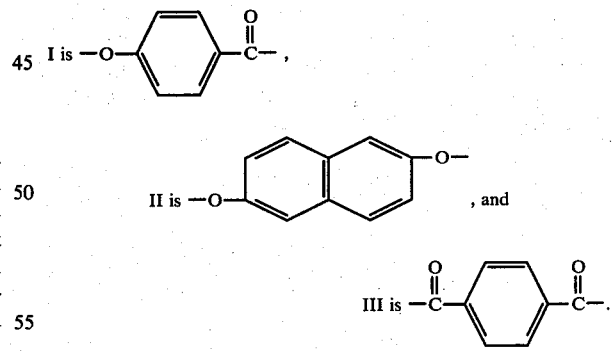

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,238,599 is a melt processable polyester capable of forming an anisotropic melt phase at a temperature no higher than approximately 320° C. consisting essentially of the recurring moieties I, II, III and IV wherein:

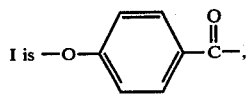

I is

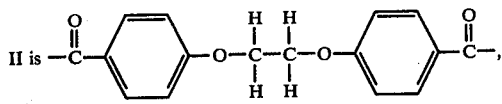

II is

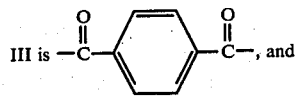

III is —C—⌬—C—, and

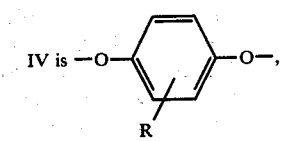

IV is where
  R is methyl, chloro, bromo, or mixtures thereof, and is substituted for a hydrogen atom present upon the aromatic ring,
and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV. The polyester preferably comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantailly identical to that of moiety IV. In addition, at least some of the hydrogen atoms present upon the rings optionally may be replaced by substitution selected from the group consisting of an alkyl group of 1 to 4 carbom atoms, an alkoxy group of 1 to 4 carbon atoms, halogen, phenyl, substituted phenyl, and mixtures thereof. This wholly aromatic polyester commonly exhibits an inherent viscosity of at least 2.0 dl./g., e.g., 2.0 to 10.0 dl./g., when dissolved in a concentration of 0.1 weight volume percent in pentafluorophenol at 60° C.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III and IV wherein:

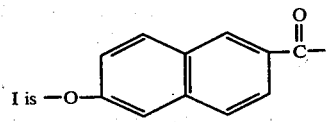

I is

-continued

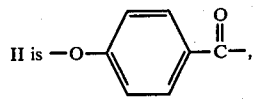

II is

III is a dioxy aryl moiety of the formula ─{O—Ar—O}─ wherein Ar is a divalent radical comprising at least one aromatic ring, and IV is a dicarboxy aryl moiety of the formula

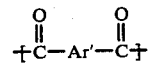

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

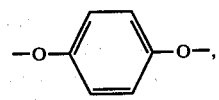

and the preferred dicarboxy aryl moiety IV is:

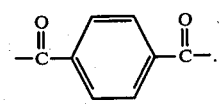

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II, and III wherein:
  I is

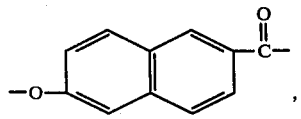

II is a dioxy aryl moiety of the formula [—O—Ar—O—] where Ar is a divalent radical comprising at least one aromatic ring, and III is a dicarboxy aryl moiety of the formula

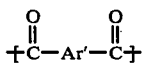

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties II and III of the polyester described immediately above are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties II and III are set forth in above-noted U.S. Pat. No. 4,256,624. The preferred dioxy aryl moiety II is:

and the preferred dicarboxy aryl moiety III is:

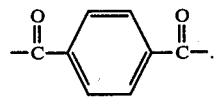

U.S. Pat. No. 4,330,457 discloses a melt processable polyester-amide which is capable of forming an anisotropic melt phase at a temperature below approximately 400° C. The polyesteramide consists essentially of the recurring moieties I, II, III and optionally IV wherein:

I is

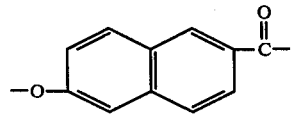

II is

where A is a divalent radical comprising at least one aromatic ring or a divalent trans-cyclohexane radical;

III is ⁺Y—Ar—Z⁺ where Ar is a divalent radical comprising at least one aromatic ring, Y is O, NH, or NR, and Z is NH or NR, where R is an alkyl group of 1 to 6 carbon atoms or an aryl group; and IV is ⁺O—Ar'—O⁺ where Ar' is a divalent radical comprising at least one aromatic ring;

and wherein said polyester-amide comprises approximately 10 to 90 mole percent of moiety I, approximately 5 to 45 mole percent of moiety II, approximately 5 to 45 mole percent of moiety III and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferred moieties, II, III and IV are set forth in above-noted U.S. Pat. No. 4,330,457. The preferred dicarboxy aryl moiety II is:

the preferred moiety III is:

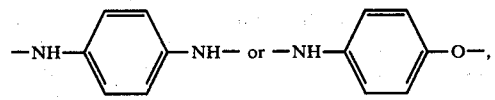

and the preferred dioxy aryl moiety IV is:

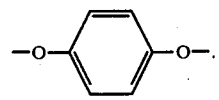

The articles of the present invention may be produced by injection molding. The injection molding apparatus used in conjunction with the method of the present invention is not critical to practice of the invention and may be any conventional injection molding apparatus. Examples of suitable apparatus are found, for example, in *Modern Plastics Encyclopedia*, Vol. 54. Oct. 1977, pages 308–311, and *Plastics Engineering Handbook*, 3rd Edition, 1960, pages 45–54 and 399–431, each herein incorporated by reference.

In order to produce the molded articles of the present invention, various methods of injection molding may be employed. For example, typical injection molding methods employ an injection unit which converts the plastic material into a viscous liquid and causes it to pass through a runner system whereby it enters the mold cavity by way of a gate(s). The articles of the present invention can be of any configuration depending upon the type of mold employed. For example, the articles may comprise a bar, may be cylindrical in nature, or may comprise a sheet, etc.

The inherently weak weld line may be provided in the molded article by several means by use of the above apparatus. For instance, the key to formation of the weld line is ensuring that two separate streams of the molten liquid crystalline polymer are caused to meet and adhere to one another during the molding procedure. Due to the anisotropic melt characteristics of the liquid crystalline polymer, the separate streams do not merge to form a single homogenous stream upon meeting. Rather, the streams maintain a distinct boundary between one another while still adhering to one another at the point of contact subsequent to the cooling of the polymer streams. Subsequent to being removed from the mold, the molded article will contain an inherently weak weld line defined by the point of contact of the separate polymer streams. The weld line, while processing sufficient structural stability at unloaded conditions, can be caused to fail under various conditions. For example, the article can be maintained in a fixed position at the weld line and a load applied to the respective ends to cause the article to fail at the weld line. Alternatively, a load can be applied directly to the weld line of sufficient magnitude to cause the weld line to fail.

The weld line will traverse the molded article in a lateral or longitudinal direction such that the article can be separated into distinct portions by application of a load as discussed above. The size and/or configuration of such distinct portions can be predetermined by proper selection of the method of injection molding.

For example, a molded bar can be provided which can be separated into two portions as a result of the presence of a weld line which laterally traverses the bar at a point between the ends thereof. As depicted in FIG. 1, such an article can be formed by the use of an injection mold 2 having two gates 4, 6 which are located in opposing ends of the mold and vent 8; i.e., the molten polymer enters the mold from opposite directions and the two streams intersect in the interior of the mold at some point between the ends. The relative location of the weld line 10 (FIG. 2) in the molded article 12 is determined by which stream enters the mold first and at what speed, with the weld line being formed as the two streams intersect and subsequently cool.

If a weld line is desired which extends longitudinally through the molded article, an insert (e.g., horizontal or vertical) can be placed either in the runner or the gate which will divide the molten polymer being injected into the mold into separate streams which, subsequent to passing by the insert, will be placed in juxtaposition and adhere to one another upon cooling. Such an insert can simply comprise a relatively thin plate or sheet which suffices to divide the molten stream as noted above.

Another method by which a similar orientation of the weld line can be achieved is by the injection of separate streams into the mold from approximately the same location. For example, two streams of the molten polymer can enter the mold at an angle perpendicular to the respective intersecting walls of the mold such that each stream is generally perpendicular to the other but oriented at a 45° angle to the longitudinal axis of the article to be molded. Of course, as depicted in FIG. 3, the two streams may also suitably be caused to enter the mold 14 having vent 16 at adjacent gates 18, 20 whereby the streams are substantially parallel and placed in juxtaposition soon after entering the mold to form weld line 22. It has been found that the formation of the weld line can be enhanced by injection of the two streams whereby streams are of differing temperature, albeit each being at a temperature in excess of the melting temperature of the polymer.

As noted above, the specific method employed depends upon the weld line orientation desired. One of ordinary skill in the art can readily determine an applicable method by which the desired weld line orientation can be achieved.

Articles may be molded from a molding compound which includes, as one component, the polymer of the present invention. Such a molding compound may include approximately 1 to 50 percent, preferably approximately 10 to 30 percent by weight, based upon the total weight of the molding compound, of a solid filler and/or reinforcing agent. Representative fibers which may serve as reinforcing agents include glass fibers, asbestos, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool, and wood cellulose fibers, etc. Representative filler materials include calcium silicate, silica, clays, talc, mica, polytetrafluoroethylene, graphite, alumina trihydrate, sodium aluminum carbonate, barium ferrite, etc.

In order to form the article of the present invention by injection molding, the polymer or molding compound is brought to the melt temperature of the polymer, e.g., approximately 280° C. to 300° C., and is then injected into a mold cavity. The mold cavity is commonly maintained at a temperature less than approximately 100° C. The polymer in its melt phase is injected into the mold cavity at a pressure of approximately 10,000 p.s.i. The cycle time (i.e., the time between injections) for the present blend commonly is about 10 to 40 seconds.

The articles of the present invention may be used in those situations normally consistent with the use of injection molded articles. However, the presence of the weld line enables other advantages to be achieved. For example, the article may be used as a vertical support (e.g., a highway stanchion) which is capable of shearing off at the ground (if the weld line is so located) upon application of sufficient force thereto to avoid injury which may otherwise result from contact therewith.

The invention is additionally illustrated in connection with the following Example which is to be considered as illustrative of the present invention. It should be understood, however, that the invention is not limited to the specific details of the Example.

EXAMPLE

To a three-neck, round flask equipped with a stirrer, argon inlet tube, and a heating tape-wrapped distillation head connected to a condenser are added 67.5 grams of p-acetoxybenzoic acid (0.375 mole) and 28.7 grams of 6-acetoxy-2-naphthoic acid (0.12 mole). The charged flask is vacuum purged with argon three times and brought to a temperature of 250° C. At 250° C. the clear, slightly tinted reaction solution is stirred rapidly under a slow stream of dry argon while acetic acid is distilled from the polymerization vessel. The reaction melt turns opaque with suspended polymer after approximately 9 milliliters of acetic acid are collected. The polymerization mixture is stirred for 3 hours at 250° C., and then for 1 hour and 15 minutes at 280° C. About 24 milliliters of acetic acid are collected during these stages. The polymerization temperature is next increased to 320° C. The viscous polymer melt is held for 25 minutes at 320° C. under an argon flow and then subjected to a series of reduced pressure stages. The argon flow is halted and the pressure above the stirred polymer melt reduced to and held at 240 mm. of mercury for about 5 minutes. Over the next 9 minutes the pressure is reduced in stages to about 0.1 to 0.2 mm. of mercury and maintained at this pressure level for about 26 minutes. During these stages the polymer melt continues to increase in viscosity and is stirred more slowly while the remaining acetic acid is removed from the reaction vessel. Upon cooling (i.e., to about 25° C.) the polymer plug is finely pelletized and dried in a forced air oven at 150° C. for 50 to 60 minutes.

A sample of the product is injection molded on an injection molding machine from opposing gates as depicted in FIG. 1 to form bars having the configuration of standard molding bars according to ASTM specifications. The injection molding conditions include a mold temperature of about 95° C., an injection cycle time of about 12 seconds, a cooling cycle time of about 20 seconds and a delay cycle time of about 3 seconds for a total cycle time of about 35 seconds. Injection pressure is approximately 12,000 psi and screw rpm is about 260. The polymer is injection molded from each gate simultaneously to form a molding bar having an inherently weak weld line position equidistant from each end in a direction transverse to the longitudinal axis of the bar. The bar separates into two distinct portions upon application of a sufficient load to the respective ends of the bar to flex the bar in the middle and cause the weld line to fail.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A molded article comprised of a polymer which is capable of forming an anisotropic melt phase and which includes an inherently weak weld line incorporated therein which traverses said article and which enables said article to be readily separated into separate and distinct portions of predetermined dimension by application of sufficient load whereby said article is caused to separate into said portions at said weld line.

2. The article of claim 1 wherein said polymer is a wholly aromatic polymer.

3. The article of claim 2 wherein said polymer is a wholly aromatic polyester.

4. The article of claim 1 wherein said polymer comprises at least about 10 mole percent of recurring units which include a naphthalene moiety.

5. The article of claim 1 wherein said polymer comprises a melt processable wholly aromatic polyester which is capable of forming an anisotropic melt phase and consists essentially of the recurring moieties I, II, and III wherein:

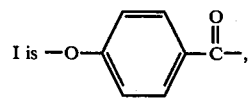

I is

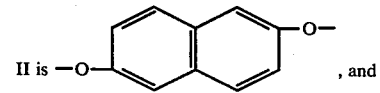

II is , and

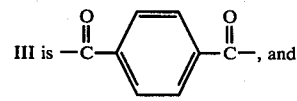

III is , and wherein said polyester comprises approximately 30 to 70 mole percent of moiety I or wherein at least some of the hydrogen atoms present upon the rings are replaced by substitution selected from the group consisting of an alkyl group of 1 to 4 carbon atoms, an alkoxy group of 1 to 4 carbon atoms, halogen, phenyl, substituted phenyl, and mixtures thereof.

6. The article of claim 1 wherein said polyester comprises approximately 40 to 60 mole percent of moiety I, approximately 20 to 30 mole percent of moiety II, and approximately 20 to 30 percent of moiety III.

7. The article of claim 1 wherein said polymer comprises a melt processable wholly aromatic polyester which is capable of forming an anisotropic melt phase and consists essentially of the recurring moieties I and II wherein:

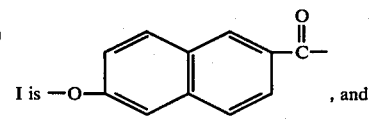

I is , and

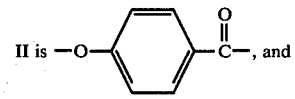

II is , and wherein said polyester comprises approximately 10 to 90 mole percent of moiety I, and approximately 10 to 90 mole percent of moiety II or wherein at least some of the hydrogen atoms present upon the rings are replaced by substitution selected from the group consisting of an alkyl group of 1 to 4 carbon atoms, an alkoxy group of 1 to 4 carbon atoms, halogen, phenyl, substituted phenyl, and mixtures thereof.

8. The article of claim 7 wherein said polyester comprises approximately 65 to 85 mole percent of moiety II.

9. The article of claim 7 wherein said polyester comprises approximately 15 to 35 mole percent of moiety II.

10. The article of claim 1 wherein said polymer comprises a melt processable wholly aromatic polyester which is capable of forming an anisotropic melt phase and consists essentially of the recurring moieties I, II, and III wherein:

I is

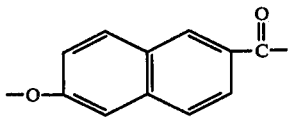,

II is a dioxy aryl moiety of the formula $-\!\!\left[\mathrm{O}\!-\!\mathrm{Ar}\!-\!\mathrm{O}\right]\!\!-$ where Ar is a divalent radical comprising at least one aromatic ring, and III is a dicarboxy aryl moiety of the formula

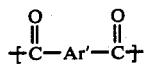

where Ar' is a divalent radical comprising at least one aromatic ring, and wherein said polyester comprises approximately 10 to 90 mole percent of moiety I, approximately 5 to 45 mole percent of moiety II, and approximately 5 to 45 mole percent of moiety III or wherein at least some of the hydrogen atoms present upon the rings are replaced by substitution selected from the group consisting of an alkyl group of 1 to 4 carbon atoms, an alkoxy group of 1 to 4 carbon atoms, halogen, phenyl, substituted phenyl, and mixtures thereof.

11. The article of claim 10 wherein said polyester comprises approximately 20 to 80 mole percent of moiety I, approximately 10 to 40 mole percent of moiety II, and approximately 10 to 40 mole percent of moiety III.

12. The article of claim 1 wherein said polymer comprises a melt processable wholly aromatic polyester which is capable of forming an anisotropic melt phase and consists essentially of the recurring moieties I, II, III and IV wherein:

I is 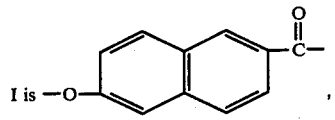,

II is 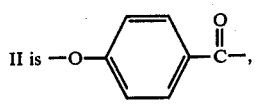,

III is a dioxy aryl moiety of the formula $-\!\!\left[\mathrm{O}\!-\!\mathrm{Ar}\!-\!\mathrm{O}\right]\!\!-$ wherein Ar is a divalent radical comprising at least one aromatic ring, and IV is a dicarboxy aryl moiety of the formula

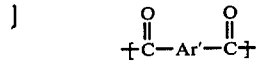

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV or wherein at least some of the hydrogen atoms present upon the rings are replaced by substitution selected from the group consisting of an alkyl group of 1 to 4 carbon atoms, an alkoxy group of 1 to 4 carbon atoms, halogen, phenyl, substituted phenyl, and mixtures thereof.

13. The article of claim 12 wherein said polyester comprises approximately 20 to 30 mole percent of moiety I, approximately 25 to 40 mole percent of moiety II, approximately 15 to 25 mole percent of moiety III and approximately 15 to 25 mole percent of moiety IV.

14. The article of claim 1 wherein said polymer comprises a melt processable polyester-amide which is capable of forming an anisotropic melt phase and consists essentially of the recurring moieties I, II, and III, or the resulting moieties I, II, III, and IV wherein:

I is

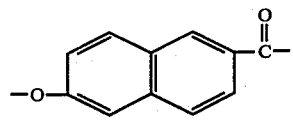,

II is

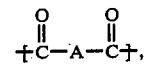, where A is a divalent radical comprising at least one aromatic ring or a divalent transcyclohexane radical;

III is $-\!\!\left[\mathrm{Y}\!-\!\mathrm{Ar}\!-\!\mathrm{Z}\right]\!\!-$, where Ar is a divalent radical comprising at least one aromatic ring, Y is O, NH, or NR, and Z is NH or NR, where R is an alkyl group of 1 to 6 carbon atoms or an aryl group; and IV is $-\!\!\left[\mathrm{O}\!-\!\mathrm{Ar}'\!-\!\mathrm{O}\right]\!\!-$, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III and approximately 0 to 40 mole percent of moiety IV or wherein at least some of the hydrogen atoms present upon the rings are replaced by substitution selected from the group consisting of an alkyl group of 1 to 4 carbon atoms, an alkoxy group of 1 to 4 carbon atoms, halogen, phenyl, substituted phenyl, and mixtures thereof.

15. The article of claim 1 which is cylindrical in form and wherein said weld line laterally traverses said article.

16. The article of claim 1 wherein said weld line longitudinally traverses said article.

* * * * *